July 30, 1968  M. J. G. TIPPER  3,394,528
APPARATUS FOR VACUUM SEALING CASINGS AND THE LIKE
Filed April 26, 1966  3 Sheets-Sheet 1

INVENTOR
MAYNARD J.G. TIPPER
BY Gordon Wood
ATTORNEY

INVENTOR
MAYNARD J.G. TIPPER

BY Gordon Wood
ATTORNEY

INVENTOR
MAYNARD J. G. TIPPER
BY Gordon Wood.
ATTORNEY

United States Patent Office 3,394,528
Patented July 30, 1968

3,394,528
APPARATUS FOR VACUUM SEALING
CASINGS AND THE LIKE
Maynard J. G. Tipper, Corona del Mar, Calif., assignor to Rheem Manufacturing Company, New York, N.Y., a corporation of California
Filed Apr. 26, 1966, Ser. No. 545,317
8 Claims. (Cl. 53—112)

This invention relates to an apparatus for vacuum sealing casings and coverings, particularly as used in packaging meat products and the like. The invention consists of apparatus very similar to that shown in U.S. Patent No. 3,237,366, dated Mar. 1, 1966, and is an improvement thereover. Since the present invention relates to only several of the mechanisms disclosed in the above patent, reference may be made to said patent for details of construction and method of operation not disclosed herein.

In sealing casings, bags and other coverings for food products and the like it is essential to extract as much air as possible from the container prior to sealing the container so as to minimize spoilage during storage or freezing. The apparatus disclosed in the above noted patent is extremely effective in that the pulling of a vacuum and the hermetic sealing of the casing or container may be accomplished by a simple manual operation so that the sealing step is performed while the vacuum is still applied to the bag or container. However, a disadvantage attending the operation of the structure shown in the prior patent is that optimum use is not made of the vacuum source thus losing vacuum and wasting the power required to create the same.

In the cited structure a vacuum conduit, adapted to be inserted in the casing or bag to be evacuated, is moved from a loading position to a clipping position at which the container is sealed. During such movement by the operator a vacuum valve is opened to evacuate the package and said valve remains open during the sealing or clipping step and is then closed during the step of returning the conduit to the loading position. The mechanical means for opening and closing the vacuum valve in the patented structure is such that the full vacuum is not imposed on the container quickly and, after the sealing step has been performed, the vacuum is not shut off immediately and thus a certain amount of vacuum is wasted after the sealing step has been performed.

The main object of the present invention is to improve the apparatus and operation disclosed in Patent No. 3,237,366.

Another object of the invention is the provision of a vacuum sealing apparatus for evacuating and sealing a bag in which optimum use is made of the vacuum without any waste.

Another object of the invention is the provision of an apparatus of the subject type in which the full vacuum available is imposed on the container immediately whenever it is desired so as to enhance the vacuum created without wasting any time between the loading and sealing operations.

Still another object of the invention is the provision of an apparatus for vacuum sealing a package in which the vacuum is immediately and automatically shut off whenever the sealing step is performed so that none of the vacuum is wasted.

Other objects and advantages of the present invention will be apparent from the following specification and from the drawings.

Figure 1:
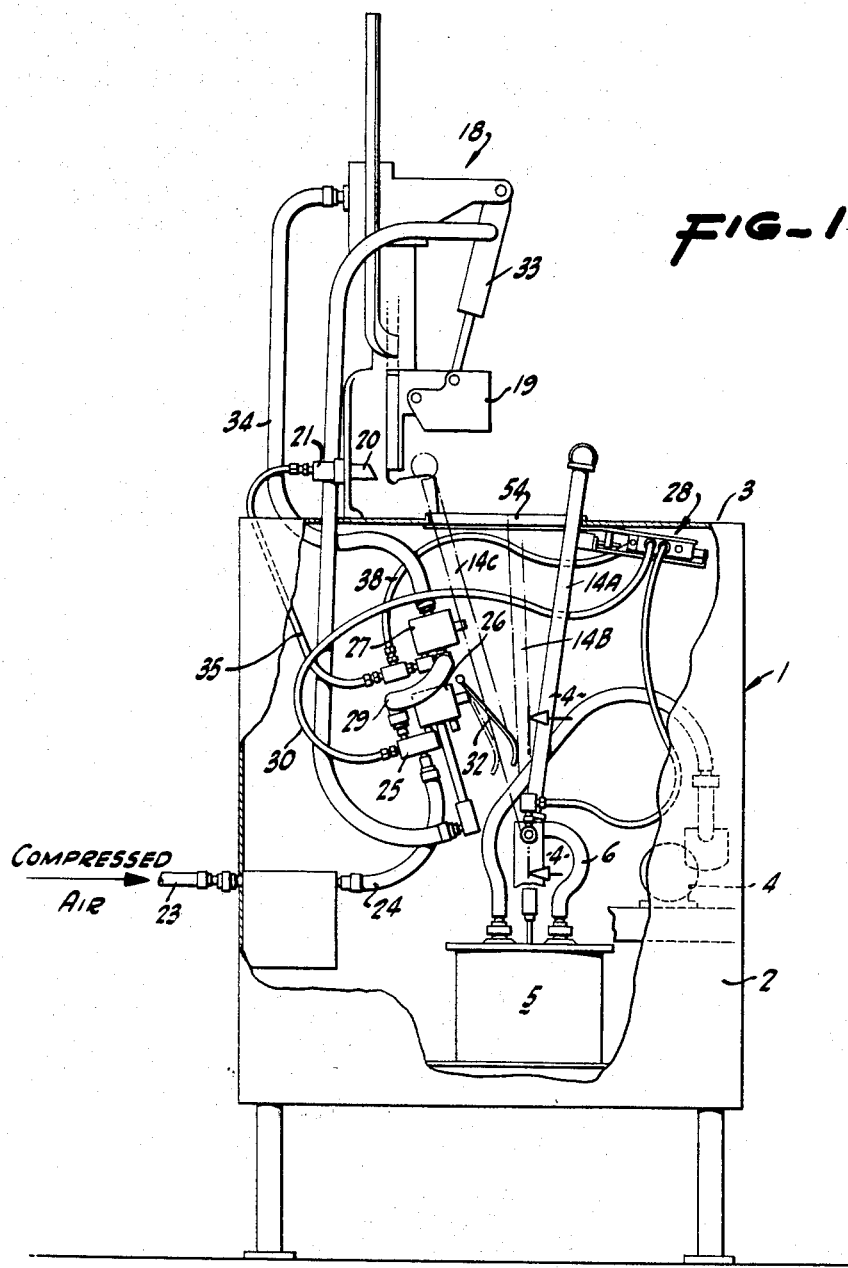
FIG. 1 is a side elevation of a vacuum sealing apparatus with a side wall of the cabinet broken away to show internal structure.
Figure 2:
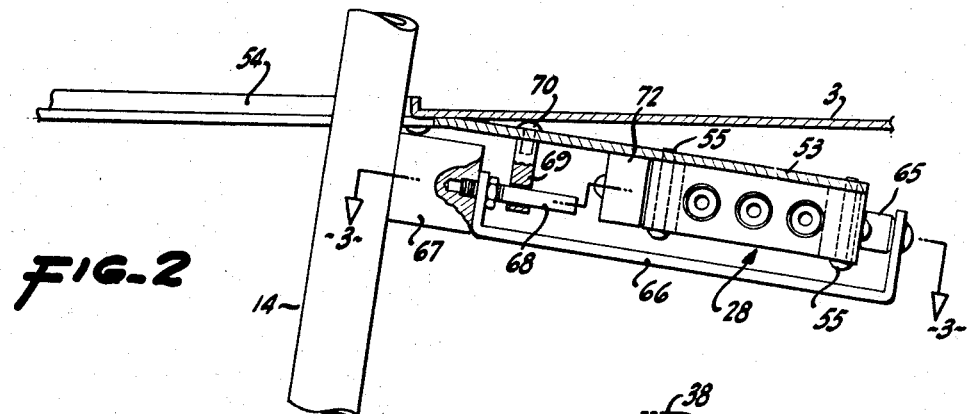
FIG. 2 is an enlarged vertical section through the apparatus of FIG. 1 showing the actuator for the vacuum valve.

FIG. 1 is a general arrangement of the apparatus from which it will be seen that the same is generally similar to that disclosed in FIG. 2 of U.S. Patent No. 3,237,366. Most of the operating devices of the invention are housed within a cabinet generally designated 1 which includes a side wall 2 and a top wall 3. Without repeating all of the disclosure given in the previously mentioned patent there is provided a motor driven evacuator or pump generally designated 4 connected to a vacuum chamber 5. A flexible hose 6 (FIG. 4) connects the vacuum chamber 5 with a horizontally extending elongated pipe 7 which is mounted for oscillation on bearings 8, 9 which in turn are supported by means of brackets 10, 11 respectively from the bottom of the housing 1.

From the pipe 7 the source of vacuum is connected through a normally closed valve generally designated 13 to an upwardly extending vacuum conduit 14 which is offset at its upper end and terminates in a manually manipulatable evacuating nozzle 15 (FIG. 7) similar to that shown in the above patent.

Before describing the improvement of the present invention in detail the general arrangement of those portions of the apparatus that are the same or similar to those disclosed in the prior patent will be briefly noted. Mounted on top of the cabinet 1 is a clipper mechanism generally designated 18 the function of which is to deform a U-shaped clip (not shown) around the neck of the casing or other container to be sealed. This apparatus will not be described in detail since it may be one of various types of clippers available and may be of the type shown in Patent No. 3,237,366. Associated with the clipper 18 there may be a swingable gate 19 which, when swung downwardly from the position of FIG. 1, gathers of the mouth of the casing or bag to be sealed prior to the clipping operation. Also associated with the clipper 18 is a knife 20 operated by an air cylinder 21.

Compressed air is employed for actuating the clipper 18 and gate 19. Such compressed air may be fed into the cabinet 1 by means of an air hose 23 which is connected by an internal hose 24 to a fitting 25 which connects the high pressure air with a gate actuating valve 26, a clipper actuating valve 27 and a vacuum valve actuator generally designated 28. The connection to clipper actuating valve 27 is by means of flexible conduit 29 and the connection to the vacuum valve actuator 28 is by means of a flexible conduit 30.

In FIG. 1 it will be seen that the generally vertically extending vacuum conduit 14 is swingably supported at its lower end in bearings 8, 9 (FIG. 4) for movement from a normal position 14A to an intermediate position 14B at which the conduit 14 is in engagement with an operating lever 32. Further movement of pipe 14 from the position of 14B toward the position of 14C causes the operating lever 32 to open the valve 26 to conduct high pressure air to cylinder 33 for actuating the gate 19. Additional movement of pipe 14 to the position of 14C causes actuation of valve 27 to actuate the clipper 18 and seal the mouth of the casing or other package. The air cylinder of clipper 18 is single acting and is returned to its normal position by a spring. Thus, the flexible hose 34 which conducts high pressure air from valve 27 to the clipper 18 also conducts the exhaust from the clipper back to valve 27 and to an exhaust port incorporated therein upon the return stroke of the air cylinder. Movement of pipe 14 from the clipping position of 14C toward the normal position 14A thus connects the exhaust from clipper 18 to a conduit 35 impressing such exhaust on the air cylinder 21 which actuates the knife 20. Said exhaust is also conducted by means of flexible hose 38 to the vacuum valve actuator 28 for a purpose which will be described in greater detail later on. Although most of the air discharged from clipper 18 may be exhausted through the exhaust port in valve 27 sufficient air remains to operate actuator 28.

At this point it will be seen that the general operation of the device and specifically the actuation of gate 19, clipper 18 and knife 20 in response to movements of pipe 14 are similar in most respects to the operation set forth in patent No. 3,237,366. However, where the structure of the prior patent employed a time delay mechanism to actuate the knife after the clipping operation had been performed, the present invention obtains such time delay without a special mechanism by employing the exhaust of the clipper to actuate air cylinder 21 associated with the knife 20. In this respect the structure of the present invention is similar to that disclosed in pending application Ser. No. 526,301, filed Feb. 9, 1966 (see FIG. 7 of said application). The particular improvement to which the present application is directed will now be described in greater detail.

Figure 4:
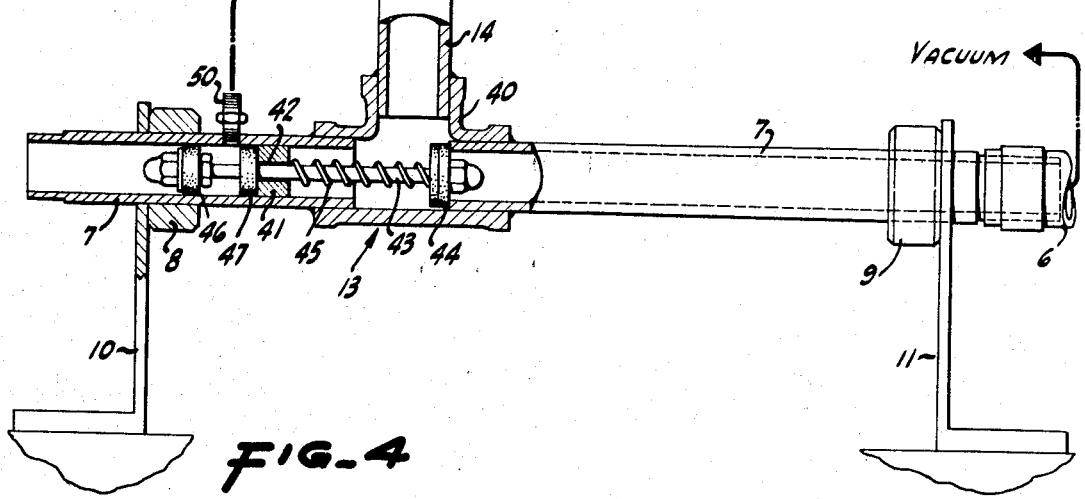
FIG. 4 is a fragmentary vertical section of the vacuum valve in closed position and showing associated conduits.

Referring to FIG. 4 the pipe 7 is split intermediate its ends and a pipe T 40 is employed to connect the two parts of the pipe 7 and to connect the latter to the upwardly extending vacuum conduit 14. The flexible hose 6 from the vacuum chamber 5 is connected to one end of pipe 7 and the other end of said pipe is open. Fitted within said other end adjacent the T 40 is a disk 41 which may be soldered or otherwise secured within the pipe. This disk 41 is provided with a central aperture 42 through which a valve stem 43 is slidable. Carried by the right hand end of valve stem 43 is a valve element 44 which is adapted to engage the inner end of the right hand portion of pipe 7 for closing off the vacuum. As seen in the closed position of FIG. 4 a compression spring 45 interposed between the valve element 44 and the fixed disk 41 urges the valve toward closed position at all times.

Figure 7:
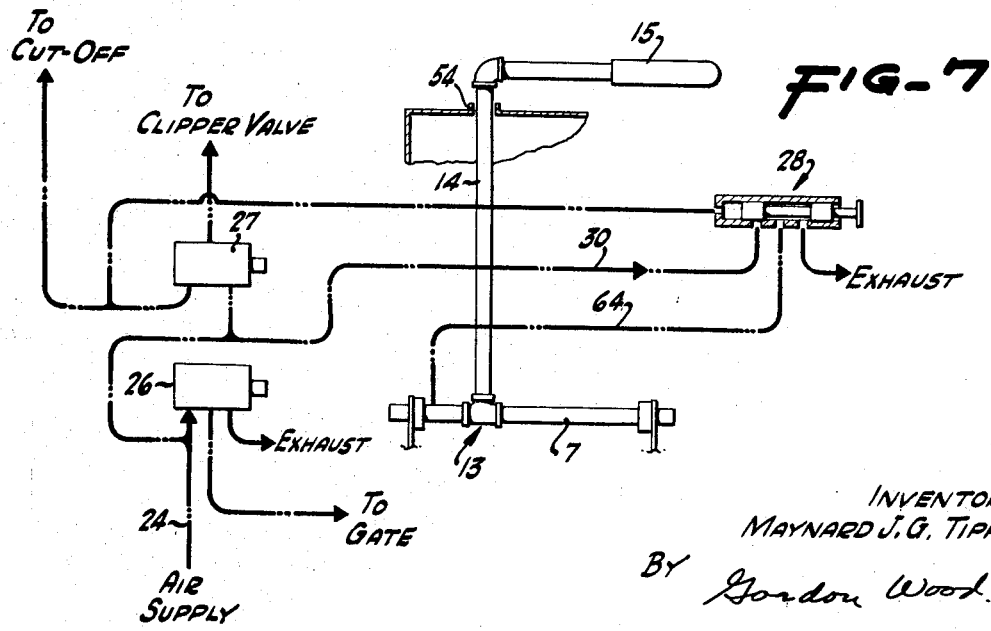
FIG. 7 is a schematic piping diagram.

The opposite end of velve stem 43 is provided with a sealing cup 46 which is slidably mounted in the inner bore of pipe 7. There is thus defined an air cylinder between the sliding cup 46 and the disk 41. In order to seal the right hand end of said cylinder a stationary cup 47 is provided against the disk 41 and is provided with a central aperture in sliding engagement with the valve stem 43 to seal the right hand end of the air cylinder. Interposed between the movable cup 46 and the stationary cup 47 is an air inlet 50 which is connected to the vacuum valve actuator 28 in a manner to be described. At this point it may be noted that when air pressure is applied through fitting 50 the force of the air urges the valve stem to the left thus opening the valve and impressing the vacuum from vacuum chamber 5 on the vacuum nozzle 15 (FIG. 7). Upon conecting the fitting 50 with the atmosphere the compression spring 45 automatically closes the vacuum valve 13.

The vacuum valve actuator 28 is mounted on plate 53 secured to the underside of the top 3 of the cabinet 1. It will be noted that the top 3 is provided with an elongated slot 54 within which the vacuum pipe 14 may swing. In FIGS. 1 and 2 the vacuum pipe 14 is slightly inclined to the vertical and it will be seen that plate 53 is provided with a downwardly slanting end portion perpendicular to pipe 14. The vacuum valve actuator 28 is secured to said portion by means of screws 55.

Figure 3:
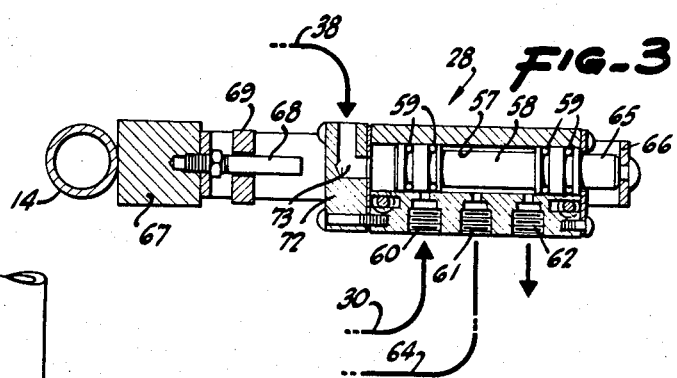
FIG. 3 is a section in a substantially horizontal plane of the actuator in normal inoperative position.

As best seen in FIG. 3 the actuator 28 is provided with a longitudinally extending bore 57 in which is slidably received a valve element 58 provided with seals 59 at each end. Communicating with bore 57 is a compressed air inlet 60, an outlet 61 and an exhaust port 62. The air hose 30 (FIG. 1) is connected to inlet 60 but, as best seen in FIG. 3, such compressed air is sealed off from communication with outlet 61 when the valve element 58 is in its normal position. However, upon movement of valve element 58 to the left from the position shown in FIG. 3, the high pressure air is connected from line 38 to line 64 so as to open the vacuum valve 13.

Figure 5:
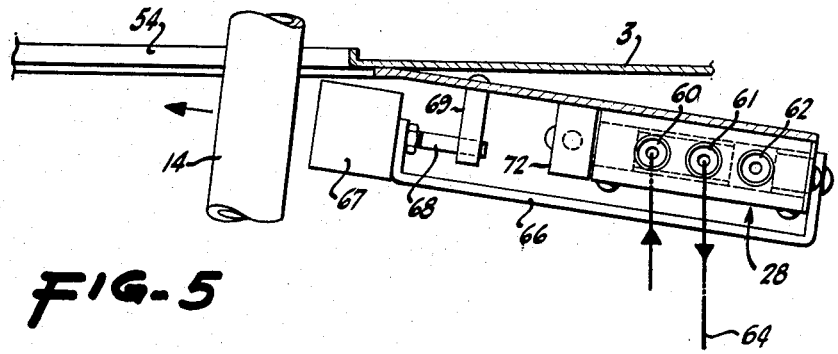
FIG. 5 is a view similar to FIG. 2 but with the actuator in operating position.
Figure 6:
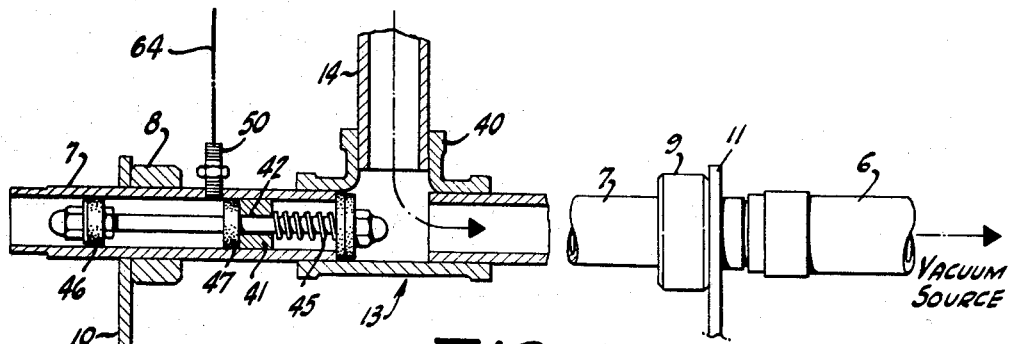
FIG. 6 is a view similar to FIG. 4 but with the vacuum valve in open position.

Valve element 58 is provided with an extension 65 to which is secured one end of a generally U-shaped bracket 66 which is connected at its other end to a permanent magnet 67. A rod 68 is threadedly secured at one end to the magnet 67 and is slidably disposed within a block 69 of antifriction material such as nylon and which block in turn is secured by screws 70 to bracket 53. At this point it will be seen that upon movement of the vacuum conduit 14 to the left as seen in FIG. 2 the magnet 67 and therefore the valve element 58 is moved to the right hand position of FIG. 5 before the force exerted by the operator on conduit 14 is sufficient to free the latter from magnet 67.

At the left hand end of the actuator 28 the same is provided with a head 72 in which a port 73 is formed. Flexible line 38 connected with the exhaust from clipper 18 is secured to port 73 so that upon actuation of the clipper the exhaust from said clipper is impressed on valve element 58 upon return stroke of the clipper after the bag or other container has been sealed.

Two important advantages accrue from the use of the above described apparatus. First, upon movement of the vacuum conduit 14 to the left from the loading position of FIG. 2 the vacuum valve 13 is immediately moved to a wide open position by the compressed air from actuator 28. There is therefore no slow time consuming buildup of vacuum and the bag or other container is immediately evacuated. A continued movement of the vacuum conduit 14 to the left actuates the gate 19, clipper 18 and the cut-off knife 20 as described above. Immediately upon actuation of the clipper 18 the discharged air from said clipper actuates actuator 28 thereby immediately closing vacuum valve 13 so that no vacuum is wasted. In addition to the saving of vacuum effected by the above apparatus it will be seen that a faster operation is possible since it is not necessary for the operator to wait for the vacuum to build up prior to initiating the clipping step.

The above specific description of the preferred form of the invention should not be taken as restrictive since it will be apparent that various modifications in design may be resorted to by those skilled in the art without departing from the scope of the following claims.

I claim:
1. In a vacuum sealing apparatus for evacuating a bag containing a product and thereafter sealing said bag,
   a vacuum conduit connected with a source of vacuum and formed at one end for insertion into the mouth of said bag,
   a sealing device for applying an air tight seal to the mouth of said bag,
   said conduit being supported for movement of said one end from a normal position spaced from said sealing device to a sealing position adjacent said device,
   a normally closed vacuum valve for controlling the vacuum applied to said one end,
   actuating means for actuating said vacuum valve,
   means interconnecting said conduit with said actuating means when said conduit is in normal position for moving said actuating means to a position opening said vacuum valve when said conduit is moved from said normal position toward said sealing position,
   and means operatively connecting said sealing device and said actuating means for closing said vacuum valve automatically upon activation of said sealing device.

2. Apparatus according to claim 1 wherein said sealing device is an air actuated clipper for tightly encircling the mouth of said bag with a clip, and wherein said actuating means comprises a valve operated by the exhaust from said clipper for closing said vacuum valve.

3. Apparatus according to claim 1 wherein said actuating means comprises a valve connecting a source of compressed air with said vacuum valve and movable from a normal position connecting said vacuum valve to atmosphere to an operative position connecting said vacuum valve with said source of compressed air for opening said vacuum valve.

4. Apparatus according to claim 2 wherein said interconnecting means comprises a magnet mounted for movement with the valve element of said actuating valve and adapted to engage said conduit when the latter is in said normal position, whereby the magnetic force of said magnet moves said valve element to a position opening said vacuum valve before said conduit disengages from said magnet.

5. Apparatus according to claim 4 wherein upon actuation of said clipper the exhaust from said clipper is connected with said valve element for moving the latter to a position closing said vacuum valve.

6. Apparatus according to claim 1 wherein said vacuum valve is spring urged to a closed position and is opened by compressed air,
 means connecting said vacuum valve with a source of compressed air,
 said actuating means comprising a valve controlling the flow of compressed air to said vacuum valve,
 said sealing device being a clipper actuated by compressed air with the exhaust of said clipper connected with said actuating means.

7. Vacuum sealing apparatus for bags comprising:
 a vacuum conduit connected with a source of vacuum and formed at one end for insertion into the mouth of a bag,
 a clipper actuated by compressed air for applying a clip around the mouth of said bag,
 conduit means for so applying compressed air to said clipper,
 said vacuum conduit being supported for movement of said one end from a normal position spaced from said clipper to a clipping position adjacent said clipper,
 a vacuum valve interposed between said source of vacuum and said one end of said vacuum conduit for controlling the vacuum applied to said one end,
 said vacuum valve including spring means for urging the same to a normally closed position and being provided with a cylinder connected with a source of compressed air,
 an actuating valve interposed between said source of compressed air and said cylinder and provided with a movable valve element,
 said valve element having a normal position connecting said cylinder with atmosphere and an operating position connecting said cylinder with said compressed air for opening said vacuum valve against the urgency of said spring means,
 a magnet mounted for movement with said valve element,
 said magnet being positioned to engage said vacuum conduit when the latter is in said normal position whereby when said conduit is moved toward said clipping position said valve element is moved to its operating position before said conduit is released from said magnet thereby opening said vacuum valve,
 the exhaust of said clipper being connected with said actuating valve whereby the exhaust pressure from said clipper after actuation thereof is impressed on said valve element to return the latter from said operating position to said normal position thereby closing said vacuum valve.

8. Apparatus according to claim 7 wherein said conduit engages a valve at said clipping position for actuating said clipper.

References Cited

UNITED STATES PATENTS 3,237,366  3/1966  Tipper _____ 53—112
3,304,687  2/1967  Tomczak et al. _____ 53—112 X TRAVIS S. McGEHEE, *Primary Examiner.*